United States Patent

[11] 3,556,325

| [72] | Inventors | Edward J. Leahy, Albany, Oreg.<br>3912 Circle Lane, Elkart, Ind. 46514;<br>Charles E. Leahy, 923 Waverly Drive,<br>Albany, Oreg. 97321 |
|---|---|---|
| [21] | Appl. No. | 782,364 |
| [22] | Filed | Dec. 9, 1968 |
| [45] | Patented | Jan. 19, 1971 |

[54] SPARE TIRE CARRIER FOR VEHICLES
11 Claims, 6 Drawing Figs.
[52] U.S. Cl. .................................................. 214/451
[51] Int. Cl. ............................................... B62d 43/04
[50] Field of Search .......................................... 214/451,
452, 453, 454; 224/42.12, 42.13, 42.21, 42.23

[56]       References Cited
         UNITED STATES PATENTS
| 3,223,263 | 12/1965 | Fielding .................... | 214/454 |
| 3,323,667 | 6/1967 | Hall ........................... | 224/42.23X |
| 3,442,408 | 5/1969 | Kost et al. .................. | 214/451 |

*Primary Examiner*—Hugo O. Schulz
*Attorney*—Buckhorn, Blore, Klarquist and Sparkman ABSTRACT: A spare tire carrier for vehicles such as pickup trucks which mounts a spare tire horizontally beneath a rear end portion of the vehicle. To remove the spare tire, the carrier is unfastened from a rear bumper of the vehicle, slid rearwardly and pivoted downwardly of the vehicle, thereby permitting the tire to be lifted from a flexible sling portion of the carrier formed by a series of chain segments.

INVENTORS
EDWARD J. LEAHY
CHARLES E. LEAHY
BY
BUCKHORN, BLORE, KLARQUIST & SPARKMAN
ATTORNEYS

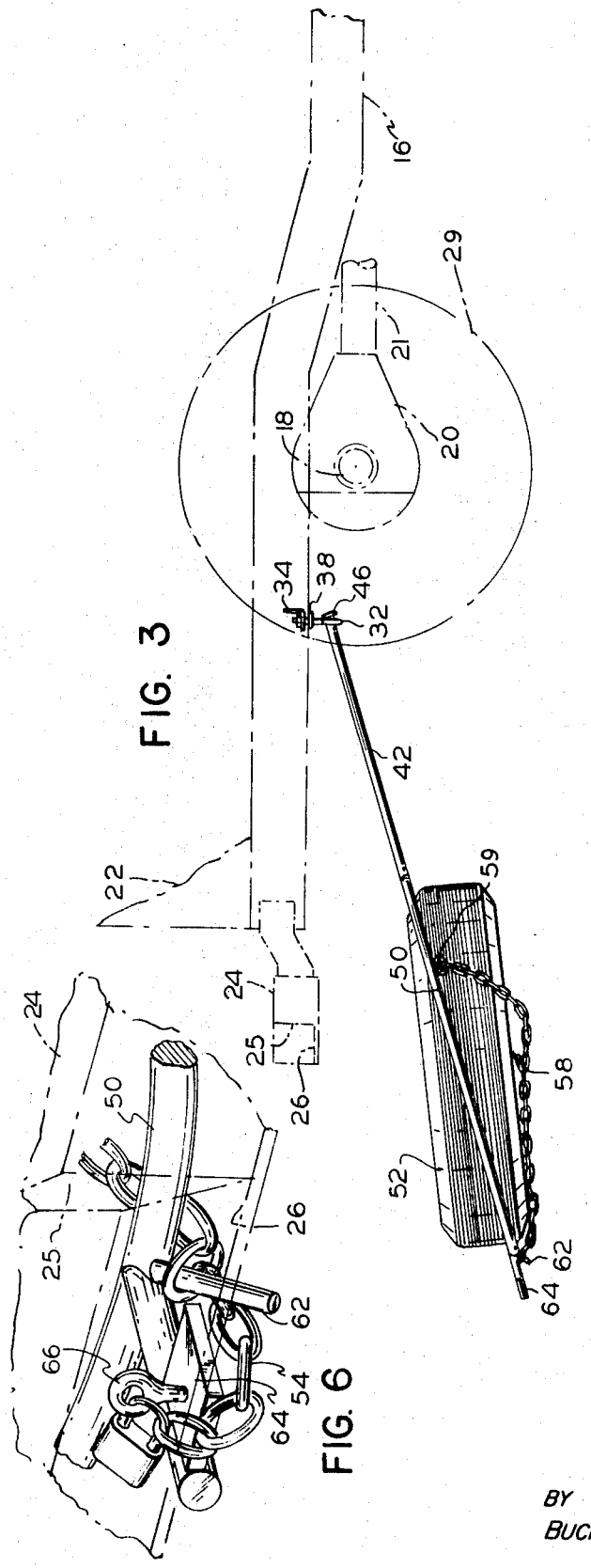
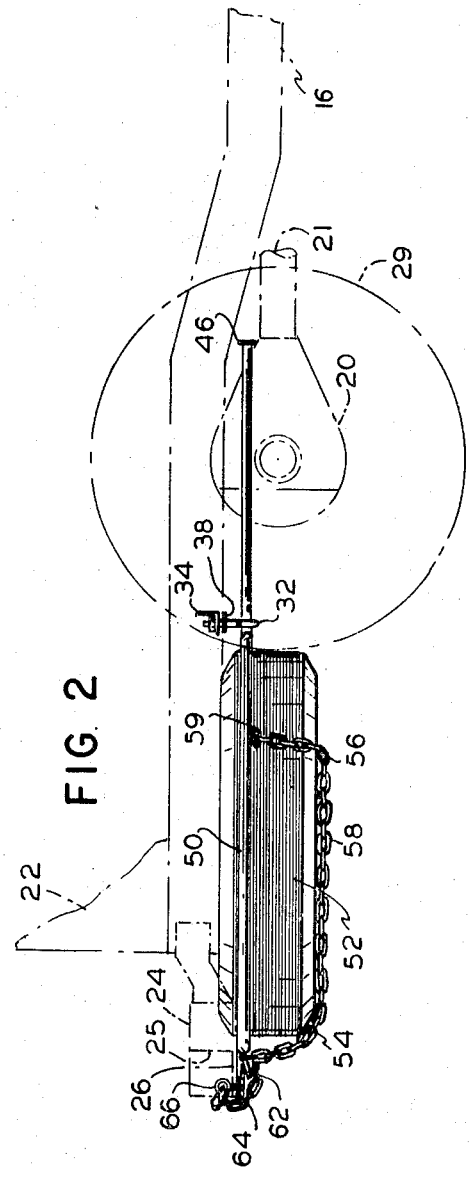
INVENTORS
EDWARD J. LEAHY
CHARLES E. LEAHY
BY
BUCKHORN, BLORE, KLARQUIST & SPARKMAN
ATTORNEYS

SPARE TIRE CARRIER FOR VEHICLES

BACKGROUND OF THE INVENTION

1. Field of the Invention

The present invention relates to a spare tire carrier for vehicles and more particularly to a carrier of the type adapted for carrying the spare tire beneath the vehicle frame.

2. Description of the Prior Art

Prior spare tire carriers of the foregoing type have required reaching or crawling beneath the vehicle to gain access to the spare tire, resulting in soiled clothing. Such prior carriers have also employed complicated mechanical linkages, levers or cranks and complex locking mechanisms to store and remove the spare tire from beneath the vehicle frame. Furthermore, prior spare tire carriers have been difficult to install and not adapted for universal mounting on vehicles of different types, sizes and manufacture. Moreover, because of the rough usage to which pickup trucks and other commercial-type vehicles requiring this sort of spare tire carrier are usually put and the complexity of such prior carriers, they have been subject to malfunction and premature failure.

SUMMARY OF THE INVENTION

The spare tire carrier of the present invention overcomes the foregoing problems of prior spare tire carriers through the simplicity of its construction, the ease with which it may be installed on vehicles of different types, sizes and manufacture, and by the ease with which it permits a tire to be withdrawn from and installed beneath a vehicle frame without having to crawl or reach beneath the frame. The foregoing results are achieved by a slide which carries a tire basket and which slides relative to a mating stationary member anchored to the vehicle frame to permit horizontal insertion and withdrawal of the basket from beneath the vehicle frame by a person standing alongside the vehicle. A fastener at the rear end of the basket portion of the slide fastens to an accessible portion of the vehicle body to hold the basket horizontally beneath the frame when desired.

Primary objects of the invention are to provide:

1. a tire carrier which permits a tire to be removed from and inserted beneath a vehicle by a generally horizontal sliding movement of the carrier by a person standing alongside the vehicle;
2. a spare tire carrier having a minimum of moving parts;
3. a spare tire carrier having a simple fastening and locking mechanism;
4. a spare tire carrier adapted for universal mounting on vehicles of different sizes, types and makes;
5. a spare tire carrier which is adjustable in size to accommodate spare tires of different sizes;
6. a spare tire carrier which can easily be installed by the user;
7. a spare tire carrier which will withstand rough vehicle use without failure or malfunction; and
8. a spare tire carrier which is simple and inexpensive to manufacture, install, use and maintain.

BRIEF DESCRIPTION OF THE DRAWINGS

The foregoing and other objects and advantages of the present invention will become more apparent from the following detailed description which proceeds with reference to the accompanying drawings wherein:

FIG. 2 is a side view of the tire carrier of FIG. 1 in its storage position beneath the vehicle frame;

FIG. 3 is a view similar to that of FIG. 2 showing the tire carrier withdrawn from beneath the vehicle for removal of the tire;

FIG. 6 is a perspective view illustrating the fastening mechanism of the tire carrier.

DETAILED DESCRIPTION

Figure 1:
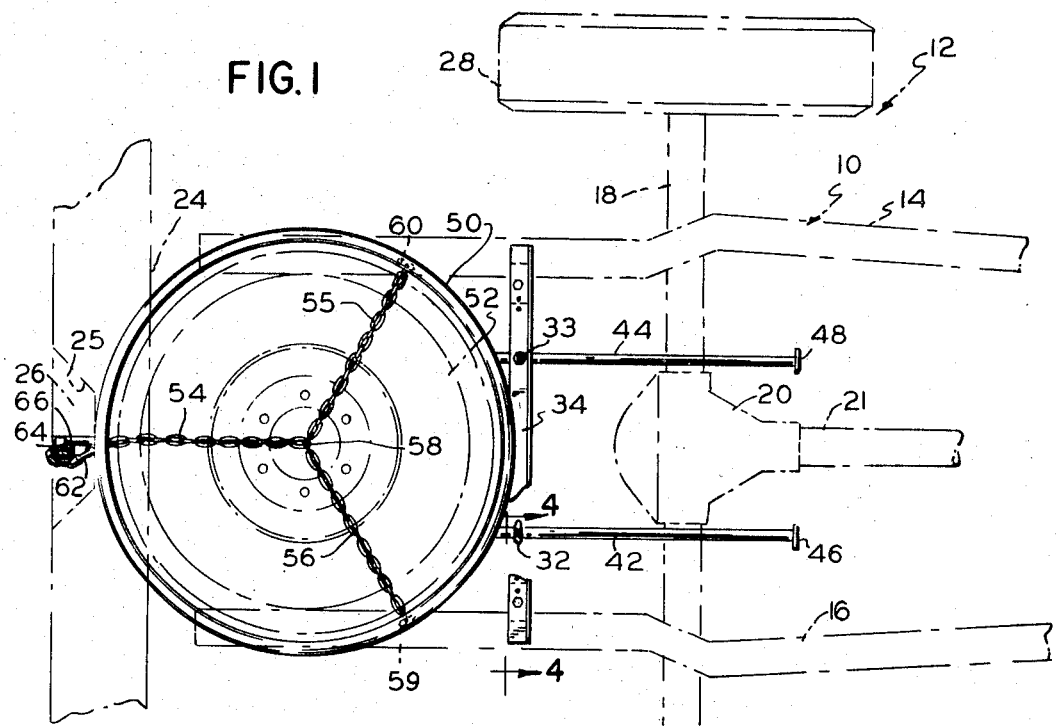
FIG. 1 is a plan view of a tire carrier in accordance with the invention shown installed on a rear frame and body portion of a vehicle.

With reference to the drawings, the tire carrier of the invention is intended for installation on a rear portion of the main frame 10 of a pickup truck or other vehicle indicated generally at 12. The frame includes longitudinal side frame members 14, 16 and a rear axle 18 with the usual differential housing 20 interconnecting the axle and drive shaft 21. A rear body portion 22 of the vehicle includes a rear bumper 24 having the usual center cutaway portion 25 with a horizontally extending plate portion 26. Rear wheels 28, 29 are supported at the opposite ends of axle 18. The foregoing conventional vehicle parts are shown for the purpose of illustrating the relative positioning and mounting of the tire carrier of the invention with respect to such vehicle elements, it being understood that such elements comprise no part of the present invention except insofar as they are utilized in cooperation and in combination with the carrier itself.

Figure 4:
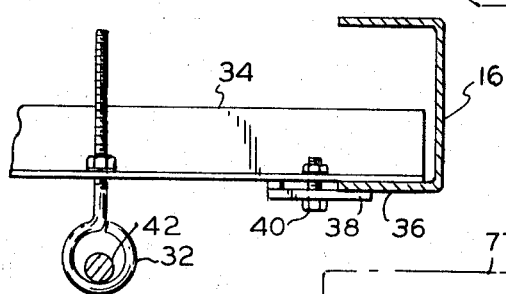
FIG. 4 is a sectional view taken along the line 4—4 of FIG. 1 showing on an enlarged scale the mounting of the carrier on the vehicle frame.

The spare tire carrier includes a slide assembly comprising a first, relatively stationary slide portion in the form of a pair of eye bolts 32 fastened to a slide supporting cross member 34 and a second, relatively movable slide portion in the form of elongate slide rods 42, 44. Cross member 34 extends between and is supported by longitudinal cross frame members 14, 16 of the vehicle. As shown in FIG. 4, the opposite ends of cross member 34 are clamped to a lower web portion 36 of the channel-shaped longitudinal side channel members 14, 16 by a clamping plate 38 and bolt fasteners 40 so as to eliminate the necessity of boring holes through the frame side members. Also, as illustrated best in FIG. 4 with respect to eye bolt 32, the openings of the eye bolts face longitudinally of the vehicle to receive and support slide rods 42, 44, and permit forward and rearward sliding movement of the rods beneath the frame. The slide rods are provided at their innermost ends with enlarged end flange portions 46, 48 which serve as stops to prevent inadvertent removal of the slide rods from the eye bolts upon rearward sliding movement of the rods.

The movable slide means also includes an annular hooplike peripheral frame member 50 interconnecting the outer ends of the slide rods 42 and 44. Hoop member 50 has a diameter sufficiently large to receive within its confines the largest spare tire 52 that the vehicle might use. Attached to the hoop member at equally spaced-apart points thereabout are three chain segments 54, 55, 56. These chain segments extend radially inwardly of the hoop member to a common central connection 58 which serves as a central support point for spare tire 52 at a point below the horizontal plane of the hoop.

Chain segments 55 and 56 are of fixed length by reason of their being permanently affixed to hoop member 50 at anchor points 59, 60. However, chain segment 54 is releasably connected to a rearwardly and slightly downwardly projecting chain hanger rod 62 which receives any one of several links of chain segment 54 to permit variation of the effective tire-supporting length of such chain segment. By varying the effective length of chain segment 54, the depth of the resulting basket sling formed by the three chain segments is varied also to accommodate spare tires of different widths. In this regard, the depth of the chain sling is adjusted so that the spare tire 52 extends above the upper limits of the tire support basket as defined by hoop member 50, as shown clearly in FIG. 2. Such an adjustment causes the upper side of spare tire 52 to abut the undersides of side frame members 14, 16 when the tire basket is positioned beneath the frame as shown in FIG. 2, whereby the tire will serve as a shock and noise absorber for the carrier and the frame members will hold the tire under compression in the basket.

The tire basket and slide assembly is held in its horizontal tire storage position beneath the frame by fastening means at the rear end of the basket hoop which fastens the basket hoop to the rear bumper. Such fastening means includes a plate 64 and an eye bolt 66 which is threaded through an opening in plate 64 and through an aligned threaded opening in plate 26 of rear bumper 24. The eye of eye bolt fastener 66 also serves as part of a locking means for preventing inadvertent release of the tire carrier or theft of the tire when a padlock locks together one of the links of chain segment 54 and eye bolt 66 as shown in FIGS. 2 and 5.

To remove the spare tire 52 from the vehicle, chain 54 is unlocked from eye bolt 66, and eye bolt 66 is unfastened from plate 64 of the carrier slide assembly. When this has been done, a person standing at the back of the vehicle can, by pulling rearwardly on plate 64 or the hoop, withdraw the entire movable slide assembly including the tire basket rearwardly from beneath the vehicle. During this rearward movement slide rods 42, 44 slide through eye bolts 32, 33. As shown in FIG. 4, the eye of eye bolt 32 is sufficiently large in comparison to the outer diameter of slide rod 42, to permit the downward tilting movement of the rear portion of the slide rods until the tire basket rests on the ground, as shown in FIG. 3. In this position spare tire 52 can be easily lifted from the carrier basket.

As apparent from FIGS. 1 and 2, slide rods 42, 44 are positioned on opposite sides of differential housing 20 and at a level above the level of rear axle 18 so that such vehicle elements do not obstruct the movement of the movable slide assembly.

Figure 5:
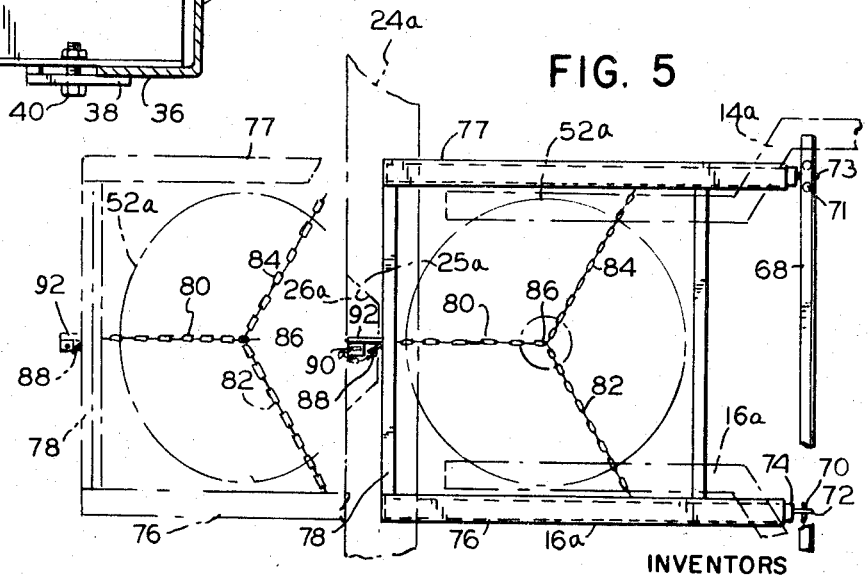
FIG. 5 is a plan view illustrating the construction and operation of a modified form of tire carrier in accordance with the invention.

FIG. 5 illustrates a modified form of tire carrier in accordance with the invention, mounted on a vehicle similar to that shown in FIG. 1, including opposite side frame members 14a, 16a, a rear bumper 24a including central cutout portion 25a having a horizontal plate 26a. In the FIG. 5 form a cross member 68 is supported at its opposite ends by longitudinal side frame members 14a, 16a, in the same manner as described with respect to the FIG. 1 embodiment. U-bolts 70, 71 are fastened to the underside of the cross member and receive hook end portions 72, 73 of a pair of elongate, rigid slide elements 74, 75. Hook end portions 72, 73 permit free downward hinging movement of the slide elements about the U-bolt connections. A pair of telescoping slide members in the form of elongate tubes 76, 77 telescope over the relatively fixed slide elements 74, 75 and are tied together at their rearmost ends by a peripheral end frame member 78. Chain segments 80, 82 and 84 radiate from a common central support connection 86 to spaced apart positions on the slide frame assembly formed by members 76, 77 and 78 to form a flexible basket sling similar to the one described with respect to the FIG. 1 embodiment for supporting a spare tire 52a. Rear chain segment 80 may be adjustably secured to a rearwardly projecting chain hanger rod 88 and then locked to an eye bolt 90 carried by a rearwardly extending fastener plate 92 on end member 78 of the movable slide assembly. Eye bolt 90 also is fastened to the bumper plate 26a to hold the carrier in its horizontal storage position.

In removing a tire from the carrier of FIG. 6, chain 80 is first unlocked from eye bolt 90 at the rear bumper, and eye bolt 90 is then released from the fastener plate 92 of the carrier slide assembly so that the slide assembly, including telescoping slide members 76, 77 and the basket partially formed by them can be pulled rearwardly from beneath the vehicle frame. During this rearward sliding movement, tubular slide members 76, 77 slide rearwardly over stationary slide members 74, 75. At the same time the hinged connection of slide members 74, 75 to cross member 68 permits downward pivoting movement of the rear of the slide assembly and tire basket to the ground so that the tire 52a can be lifted from the basket.

It will be apparent from the foregoing that a spare tire can be supported beneath a vehicle frame and removed therefrom when needed without crawling or reaching beneath the vehicle. It will also be apparent that the only moving part of the spare tire carrier is the movable slide assembly itself, thereby minimizing wear and the possibility of malfunction. Furthermore, by providing the cross member with sufficient length and a series of several different holes for securing clamping plate 38 to the cross member, the assembly can be installed on vehicles having different spacings between longitudinal side frame members. Furthermore, the vertical level of the eye bolts 32 can be adjusted through a wide range by providing sufficiently long threaded shanks on the eye bolts or the U-bolts so that the slide rods can be mounted to clear the vehicle axle and any other obstructions.

Having described two different embodiments of my invention, it should be apparent to those having skill in the art that the same permits of modification in arrangement and detail. I claim as my invention all such modifications as come within the true spirit and scope of the following claims.

I claim:

1. A spare tire carrier for a wheeled vehicle including a vehicle frame and body, said carrier comprising:
   first relatively stationary slide means;
   second relatively movable slide means adapted for sliding interengagement with said first slide means and partially supported by said first means;
   slide mounting means for mounting said first slide means on said frame and beneath said body and in a position such that said second slide means can be slid relative to said first slide means inwardly and outwardly from beneath said frame and body;
   tire support means on said second slide means for supporting a tire in generally horizontal disposition beneath said frame;
   and fastening means for securing a rear end portion of said second slide means to an accessible portion of said body when said tire supporting means is positioned beneath said body and frame;
   said tire support means including flexible means radiating from a common central support point for a tire to spaced-apart positions on a peripheral frame portion of said second slide means so as to form a flexible sling support for a tire.

2. Apparatus according to claim 1 wherein said flexible means includes at least three chain segments radiating from a common central support point for a tire to spaced-apart positions on said peripheral frame portion of said second slide means.

3. Apparatus according to claim 2 wherein the length of at least one of said chain segments is adjustable to vary the effective depth of said flexible sling to accommodate tires of different sizes.

4. Apparatus according to claim 1 wherein said tire support means comprises an annular peripheral frame member and at least three flexible strand means extending inwardly from spaced positions on said peripheral frame member to a common center support point radially inwardly of said frame member.

5. Apparatus according to claim 1 wherein said slide mounting means includes a cross member for extending between opposite longitudinal side frame members of said vehicle frame, and means for fastening said cross member to said opposite side frame members.

6. Apparatus according to claim 5 wherein said first slide means includes a pair of stationary eye means adapted for mounting in depending relationship to said cross member, and said second slide means includes a pair of elongate rigid members slidable within said eye means.

7. Apparatus according to claim 5 wherein said first slide means includes a pair of elongate rigid members hingedly connected to said cross member and said second slide means includes a pair of elongate tubular members telescopingly related to said elongate rigid members.

8. Apparatus according to claim 5 wherein said fastening means includes a pair of clamping means, each for clamping one of the opposite end portions of said cross member to one of said opposite longitudinal side frame members.

9. Apparatus according to claim 2 wherein said fastening means includes means for fastening said second slide means to a rear bumper portion of said vehicle and a chain hanger projection means on a rear portion of said second slide means adjacent said fastening means for removably receiving a link of one of said chain segments and thereby providing said flexible sling support with an adjustable depth.

10. In a spare tire carrier for a wheeled vehicle,
a tire support device comprising;
peripheral frame means within the confines of which a spare tire can be placed without engaging said frame means;
and at least three chain segments extending from spaced apart positions on said peripheral frame means radially inwardly to a central support point for a tire;
said support point being positioned inwardly of said peripheral frame means and below the horizontal plane of said peripheral frame means when said frame means is in its horizontally operative disposition;
said chain segments being joined together at said central support point to define a flexible basket sling for supporting a spare tire.

11. Apparatus according to claim 10 wherein at least one of said chain segments is adjustable in length by being releasably connected to said peripheral frame means so as to vary the effective depth of said basket sling to accommodate tires of different widths.